(12) United States Patent
Lee et al.

(10) Patent No.: US 7,214,283 B2
(45) Date of Patent: May 8, 2007

(54) WORKING RANGE SETTING METHOD FOR BONDING DEVICE FOR FABRICATING LIQUID CRYSTAL DISPLAY DEVICES

(75) Inventors: Sang Seok Lee, Taegu-kwangyokshi (KR); Sang Ho Park, Pusan-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/259,698

(22) Filed: Sep. 30, 2002

(65) Prior Publication Data

US 2003/0178120 A1    Sep. 25, 2003

(30) Foreign Application Priority Data

Mar. 25, 2002 (KR) .............................. P2002-15960

(51) Int. Cl.
*B32B 41/00* (2006.01)

(52) U.S. Cl. .................. 156/64; 156/358; 156/360; 414/936; 414/935

(58) Field of Classification Search ............... 156/64, 156/358, 360; 29/833, 834, 738, 739, 740
See application file for complete search history.

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,696,712 A * | 9/1987 | Nonaka ........................ 156/351 |
| 4,775,225 A | 10/1988 | Tsuboyama et al. |
| 5,247,377 A | 9/1993 | Omeis et al. ................ 359/76 |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe ............................. 141/7 |
| 5,539,545 A | 7/1996 | Shimizu et al. |
| 5,548,429 A | 8/1996 | Tsujita |
| 5,642,214 A | 6/1997 | Ishii et al. ................... 349/96 |
| 5,680,189 A | 10/1997 | Shimizu et al. |
| 5,742,370 A | 4/1998 | Kim et al. ................... 349/124 |
| 5,757,451 A | 5/1998 | Miyazaki et al. |
| 5,852,484 A | 12/1998 | Inoue et al. |
| 5,854,664 A | 12/1998 | Inoue et al. |
| 5,861,932 A | 1/1999 | Inata et al. |
| 5,875,922 A | 3/1999 | Chastine et al. |
| 5,882,451 A * | 3/1999 | Sasaki et al. ................ 156/64 |
| 5,952,676 A | 9/1999 | Sato et al. |

(Continued)

FOREIGN PATENT DOCUMENTS

EP    1003066    5/2000

(Continued)

*Primary Examiner*—George Koch
(74) *Attorney, Agent, or Firm*—McKenna Long & Aldridge LLP (57) ABSTRACT

A working range setting method of a bonding device includes identifying a model of a first substrate, extracting a set value corresponding to a working range of working elements according to the identified model, and setting the working range of the corresponding working elements with the extracted set value.

11 Claims, 7 Drawing Sheets

U.S. PATENT DOCUMENTS

| | | | |
|---|---|---|---|
| 5,956,112 A | 9/1999 | Fujimori et al. | |
| 6,001,203 A | 12/1999 | Yamada et al. | |
| 6,011,609 A | 1/2000 | Kato et al. | 349/190 |
| 6,016,178 A | 1/2000 | Kataoka et al. | 349/117 |
| 6,016,181 A | 1/2000 | Shimada | |
| 6,055,035 A | 4/2000 | von Gutfeld et al. | 349/187 |
| 6,163,357 A | 12/2000 | Nakamura | 349/155 |
| 6,219,126 B1 | 4/2001 | Von Gutfeld | |
| 6,226,067 B1 | 5/2001 | Nishiguchi et al. | 349/155 |
| 6,236,445 B1 | 5/2001 | Foschaar et al. | |
| 6,304,306 B1 | 10/2001 | Shiomi et al. | 349/88 |
| 6,304,311 B1 | 10/2001 | Egami et al. | |
| 6,337,730 B1 | 1/2002 | Ozaki et al. | |
| 6,414,733 B1 | 7/2002 | Ishikawa et al. | 349/110 |
| 6,623,577 B2 * | 9/2003 | Ogawa et al. | 156/64 |
| 2001/0021000 A1 | 9/2001 | Egami et al. | |
| 2002/0047983 A1 * | 4/2002 | Chen et al. | 349/187 |
| 2002/0117267 A1 * | 8/2002 | Ogawa et al. | 156/581 |

FOREIGN PATENT DOCUMENTS

| | | |
|---|---|---|
| JP | 51-65656 | 6/1976 |
| JP | 52-149725 | 12/1977 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 5-127179 | 5/1993 |
| JP | 5-154923 | 6/1993 |
| JP | 5-265011 | 10/1993 |
| JP | 5-281557 | 10/1993 |
| JP | 5-281562 | 10/1993 |
| JP | 6-51256 | 2/1994 |
| JP | 6-148657 | 5/1994 |
| JP | 6-160871 | 6/1994 |
| JP | 6-235925 | 8/1994 |
| JP | 6-313870 | 8/1994 |
| JP | 6-265915 | 9/1994 |
| JP | 7-84268 | 3/1995 |
| JP | 7-128674 | 5/1995 |
| JP | 7-181507 | 7/1995 |
| JP | 8-95066 | 4/1996 |
| JP | 8-101395 | 4/1996 |
| JP | 8-106101 | 4/1996 |
| JP | 8-171094 | 7/1996 |
| JP | 8-190099 | 7/1996 |
| JP | 8-240807 | 9/1996 |
| JP | 9-5762 | 1/1997 |
| JP | 9-26578 | 1/1997 |
| JP | 9-61829 | 3/1997 |
| JP | 9-73075 | 3/1997 |
| JP | 9-73096 | 3/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-133438 | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-142864 | 5/1999 |
| JP | 11-174477 | 7/1999 |
| JP | 11-212045 | 8/1999 |
| JP | 11-248930 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-137235 | 5/2000 |
| JP | 2000-147528 | 5/2000 |
| JP | 2000-193988 | 7/2000 |
| JP | 2000-241824 | 8/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |
| JP | 2001-91727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |
| JP | 2001-183683 | 7/2001 |
| JP | 2001-201750 | 7/2001 |
| JP | 2001-209052 | 8/2001 |
| JP | 2001-209060 | 8/2001 |
| JP | 2001-215459 | 8/2001 |
| JP | 2001-222017 | 8/2001 |
| JP | 2001-235758 | 8/2001 |
| JP | 2001-255542 | 9/2001 |
| JP | 2001-264782 | 9/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001-330840 | 11/2001 |
| JP | 2001-356353 | 12/2001 |
| JP | 2001-356354 | 12/2001 |
| JP | 2002-14360 | 1/2002 |
| JP | 2002-23176 | 1/2002 |
| JP | 2002-49045 | 2/2002 |
| JP | 2002-82340 | 3/2002 |
| JP | 2002-90759 | 3/2002 |
| JP | 2002-90760 | 3/2002 |
| JP | 2002-107740 | 4/2002 |

| | | | | | |
|---|---|---|---|---|---|
| JP | 2002-122872 | 4/2002 | JP | 2002-214626 | 7/2002 |
| JP | 2002-122873 | 4/2002 | KR | 2000-35302 | 6/2000 |
| JP | 2002-139734 | 5/2002 | | | |
| JP | 2002-202512 | 7/2002 | | | |
| JP | 2002-202514 | 7/2002 | * cited by examiner | | |

WORKING RANGE SETTING METHOD FOR BONDING DEVICE FOR FABRICATING LIQUID CRYSTAL DISPLAY DEVICES

The present invention claims the benefit of Korean Patent Application No. P2002-15960 filed in Korea on Mar. 25, 2002, which is hereby incorporated by reference.

BACKGROUND OF THE INVENTION

1. Field of the Invention

The present invention relates to a method for manufacturing a liquid crystal display (LCD) device, and more particularly, a working range setting method for a bonding device for manufacturing an LCD device.

2. Discussion of the Related Art

In response to an increasing demand for various types of display devices, liquid crystal display (LCD), plasma display panel (PDP), electro-luminescent display (ELD), and vacuum fluorescent display (VFD) have been developed. In particular, LCD devices are commonly used because of their high resolution, light weight, thin profile, and low power consumption. In addition, LCD devices have been implemented in mobile devices, such as monitors for notebook computers, and have been developed for monitors of computers and televisions. Accordingly, efforts to improve image quality of LCD devices contrast with the benefits of their high resolution, light weight, thin profile, and low power consumption. In order to incorporate LCD devices as a general image display, image quality such as fineness, brightness, large-sized area, for example, must be improved.

LCD devices are provided with an LCD panel for displaying image data and a driving unit for applying a driving signal to the LCD panel. The LCD panel is provided with first and second glass substrates bonded at a certain distance with liquid crystal material injected therebetween. A plurality of gate lines are formed along a first direction at fixed intervals on a first glass substrate (TFT array substrate), and a plurality of data lines are formed along a second direction perpendicular to the first direction, thereby defining a plurality of pixel regions. Then, a plurality of pixel electrodes are formed in a matrix arrangement at the pixel regions, and a plurality of thin film transistors (TFT) are formed at the pixel regions. Accordingly, the plurality of thin film transistors are enabled by signals transmitted along the gate lines and transfer signals transmitted along the data lines to each pixel electrode.

In order to prevent light leakage, black matrix films are commonly formed on a second glass substrate (color filter substrate) except at regions of the second glass substrate corresponding to the pixel regions of the first glass substrate. Also, a red, green, and blue color filter substrate is formed on the second glass substrate to generate colored light, and a common electrode is formed on the color filter substrate to produce images.

Processes for manufacturing LCD devices include injection and drop methods. The injection method, according to the related art, includes steps of forming a sealant pattern on one of the first and second substrates to form an injection inlet, bonding the first and second substrates to each other within a vacuum processing chamber, and injecting liquid crystal material through the injection inlet. The drop method according to the related art, which is disclosed in Japanese Patent Application Nos. 11-089612 and 11-172903, includes steps of dropping liquid crystal material on a first substrate, arranging a second substrate over the first substrate, and moving the first and second substrates to be adjacent to each other, thereby bonding the first and second substrates to each other.

However, the injection method required a considerably long process time since liquid crystal material is injected by osmotic pressure in a vacuum state. Accordingly, the injection method is inadequate for fabrication of large-sized LCD devices. On the other hand, the drop method is a considerably shorter process time since the liquid crystal material is deposited on a first substrate and then bonded with a second substrate.

Figure 1:
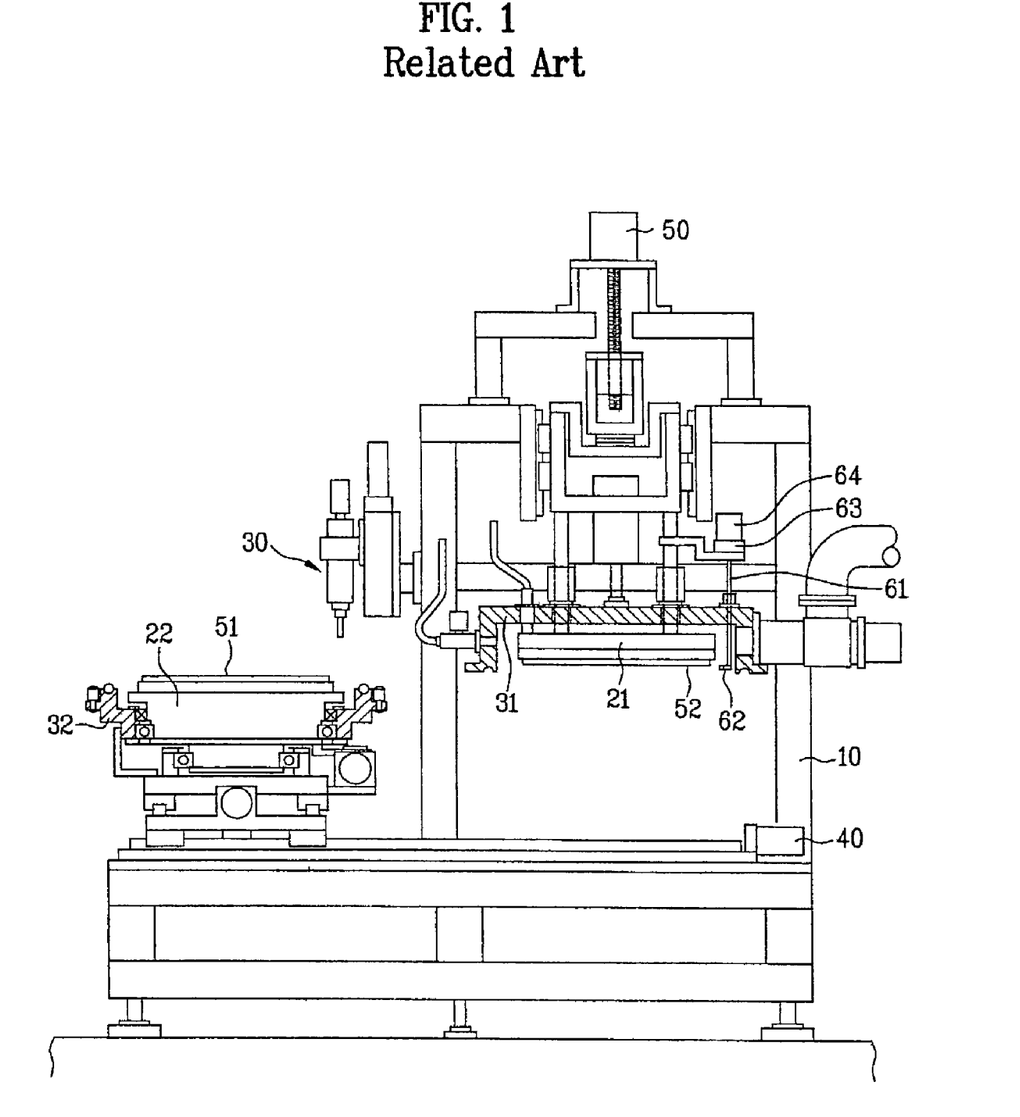
FIG. 1 is a cross sectional view of a bonding device for a liquid crystal display device according to the related art prior to a bonding process.

FIG. 1 is a cross sectional view of a bonding device for a liquid crystal display device according to the related art prior to a bonding process. In FIG. 1, a substrate bonding device includes a frame 10, an upper stage 21, a lower stage 22, a sealant dispenser (not shown), a liquid crystal material dispenser 30, a processing chamber including an upper chamber unit 31 and a lower chamber unit 32, a chamber moving system 40, and a stage moving system 50. The chamber moving system 40 includes a driving motor driven to selectively move the lower chamber unit 32 to a location at which the bonding process is carried out, or to a location at which outflow of the sealant and dropping of the liquid crystal material occur. The stage moving system 50 includes another driving motor driven to selectively move the upper stage 21 along a vertical direction perpendicular to the upper and lower stages 21 and 22.

A receiver-stopper system temporarily supports a substrate 52, which is attached to the upper stage 21, at both diagonal positions of the substrate 52 when an interior of the chamber is in a vacuum pressure state. At this time, the receiver-stopper system includes a rotation shaft 61, a rotation actuator 63, an elevation actuator 64 and support plates 62 for supporting corners of the substrate 52.

Figure 2:
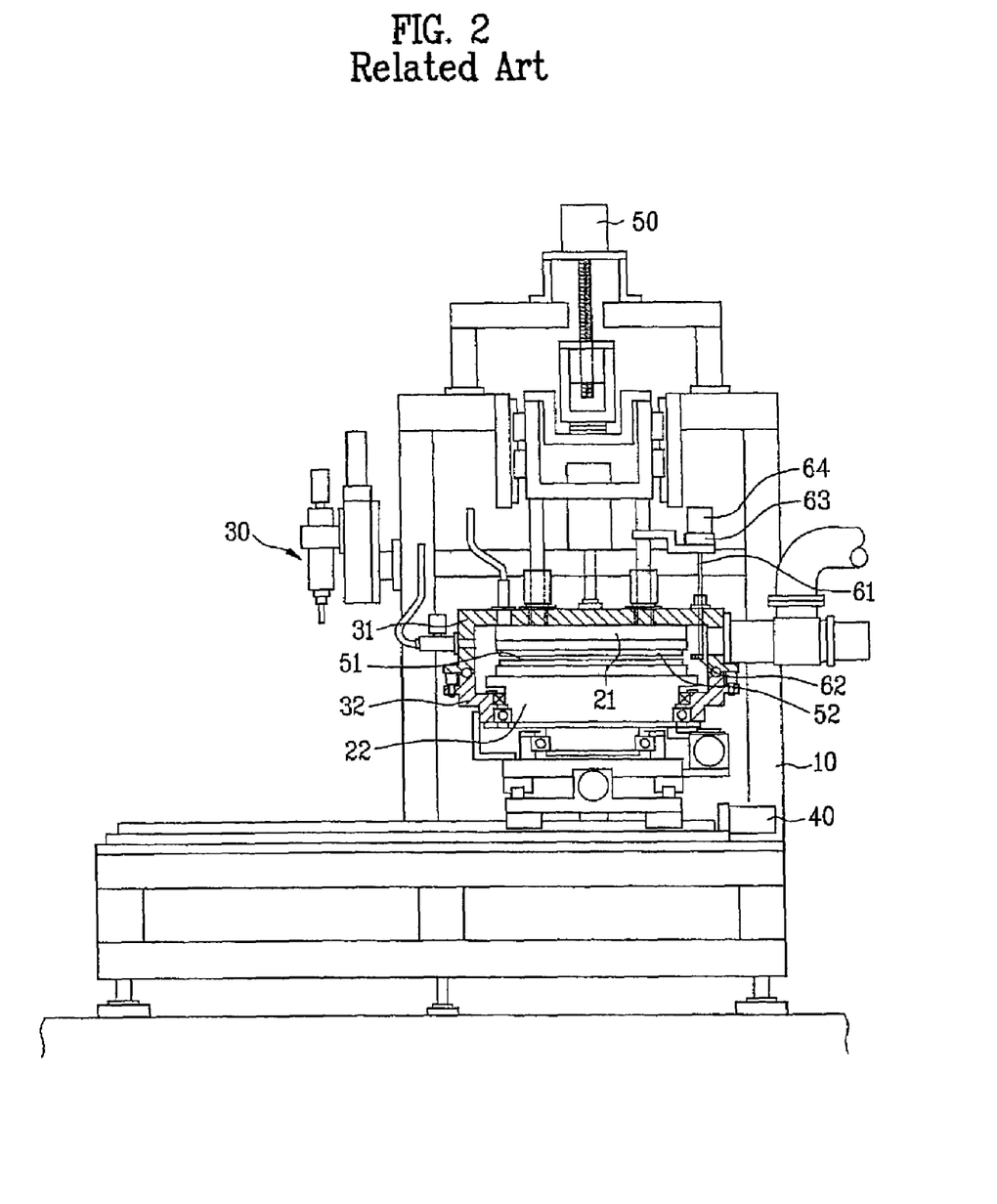
FIG. 2 is a cross sectional view of a bonding device for a liquid crystal display device according to the related art during a bonding process.
Figure 3:
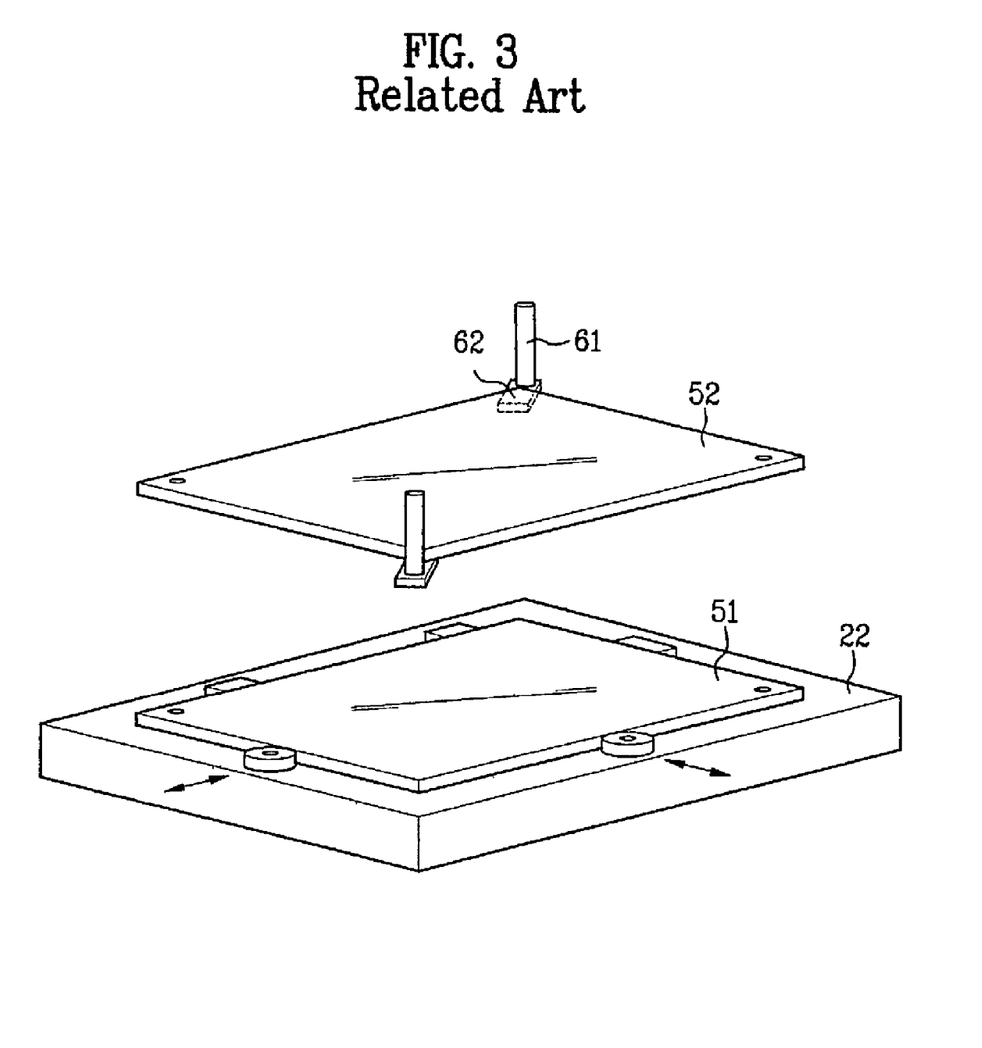
FIG. 3 is a perspective view of a substrate support system of a bonding device for a liquid crystal display device according to the related art.

A process of manufacturing a liquid crystal display device using the substrate assembly device according to the prior art will be described with reference to FIG. 2, which is a cross sectional view of a bonding device for a liquid crystal display device according to the related art during a bonding process, and FIG. 3 is a perspective view of a substrate support system of a bonding device for a liquid crystal display device according to the related art.

First, a second substrate 52 is attached to the upper stage 21, and a first substrate 51 is attached to the lower stage 22. Then, the lower chamber unit 32, having the lower stage 22, is moved by the chamber transfer means 40 to a working position for dispensing sealant and dropping liquid crystal material, as shown in FIG. 1. After the sealant dispensing process and the liquid crystal material dropping process are completed on the first substrate 51, the lower chamber unit 32 is moved again by the chamber transfer means 40 toward another working position for bonding between the substrates, as shown in FIG. 2. Then, the upper and lower chamber units 31 and 32 are coupled together by the chamber transfer means 40 to enclose a space where the stages 21 and 22 are positioned, and the elevation actuator 64 and the rotation actuator 63 constituting the receiver-stopper system are actuated to place the support plates 62 under two corners of the second substrate, which is attached to the upper stage 31. From this position, adsorptive force fixing the second substrate 52 is released to drop the second substrate 52 onto each of the support plates 62 of the receiver-stopper means as shown in FIG. 3.

At this time, pressure in an interior of the processing chamber is reduced to produce a vacuum state by a vacuum system. When the interior of the processing chamber is evacuated, an electrostatic force is applied to the upper stage 31 to attach the second substrate 52 while the rotation actuator 63 and the elevation actuator 64 are actuated so that the support plates 62 and the rotation shaft 61 do not obstruct bonding of the substrates. In the vacuum state, the upper stage 21 is moved downward by the stage transfer means 50, and bonds the second substrate 52, which is attached to the upper stage 21, and the first substrate 51, which is fixedly settled on the lower stage, thereby completing manufacturing processes of an LCD device.

The bonding device according the related art includes a number of working elements, specifically, working elements that require a considerable degree of precision, such as the stages and the substrate support means within the processing chamber. Accordingly, it is necessary to maintain the working elements at a precise distance according to the size and configuration of the first and second substrates. Moreover, since the first and second substrates may be different in their overall size and configuration and the substrates may have different cell configurations, it is necessary to carry out a selective operation according to the size and configuration of each substrate.

Considering that overall size of substrates are gradually increasing, there is a need to prevent drooping of the substrate by supporting an inside of the substrate rather than by supporting the corners during bonding processes. Accordingly, the working position of each working element preferrably should be changed according to the size and configuration of each substrate. Moreover, it is necessary to prevent any damage in the cell area by the working elements supporting dummy areas rather than the cell area including the color filter or TFT arrays.

However, as overall size and configuration of the substrates changes, positions and overall size of the cell area on the substrate is altered. Thus, once the working element is reproducibly positioned for a substrate having a first type of configuration, the working element may need to be repositioned to a substrate having a second type of configuration different from the first configuration. The bonding devices according to the related art are disadvantageous since different configurations of substrates require changing the configuration of the working elements. Specifically, when bonding substrates have a configuration different from a previously processed set of substrates, the bonding device must be reconfigured to establish a new set of working ranges corresponding to the new bonded substrates. Accordingly, in order to perform the bonding process with a new configuration of substrates in the conventional bonding process the working range of the each working element must be reconfigured. Thus, a significant increase is production processing time is required.

SUMMARY OF THE INVENTION

Accordingly, the present invention is directed to a working range setting method of a working element for an LCD device that substantially obviates one or more problems due to limitations and disadvantages of the related art.

An object of the present invention is to provide a controlling method of a bonding device used in manufacturing an LCD device.

Additional features and advantages of the invention will be set forth in the description which follows, and in part will become apparent from the description, or may be learned from practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, a working range setting method of a bonding device includes identifying a model of a first substrate, extracting a set value corresponding to a working range of working elements according to the identified model, and setting the working range of the corresponding working elements with the extracted set value.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
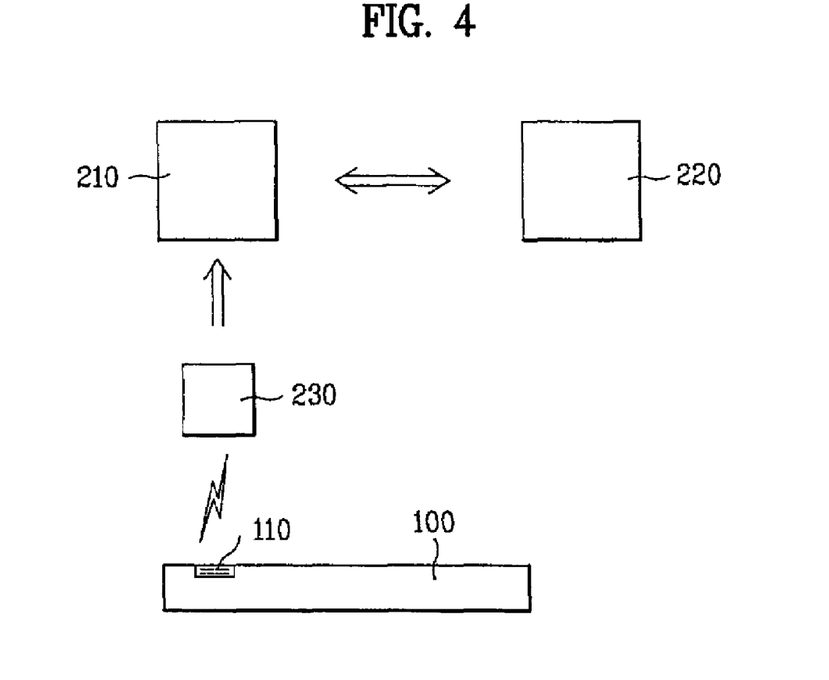
FIG. 4 is a schematic view showing an exemplary arrangement of a bonding device for a liquid crystal display device according to the present invention.

FIG. 4 is a schematic view showing an exemplary arrangement of a bonding device for a liquid crystal display device according to the present invention. In FIG. 4, an arrangement may include a substrate 100, a controller 210, a storage unit 220, and a substrate reading unit 230. The controller 210 may control behaviors of various working elements of the bonding device and may collect various data from the storage unit 220. The storage unit 220 may set the working range of the working elements according to a configuration of each substrate 100 and may store set values for each of the working elements and substrates 100. The substrate reading unit 230 may identify a configuration of each substrate 100 that is transferred into the bonding device. For example, the substrate reading unit 230 may read out a code 110 positioned on the each substrate 100 to identify the specific configuration of the substrate 100.

Figure 5:
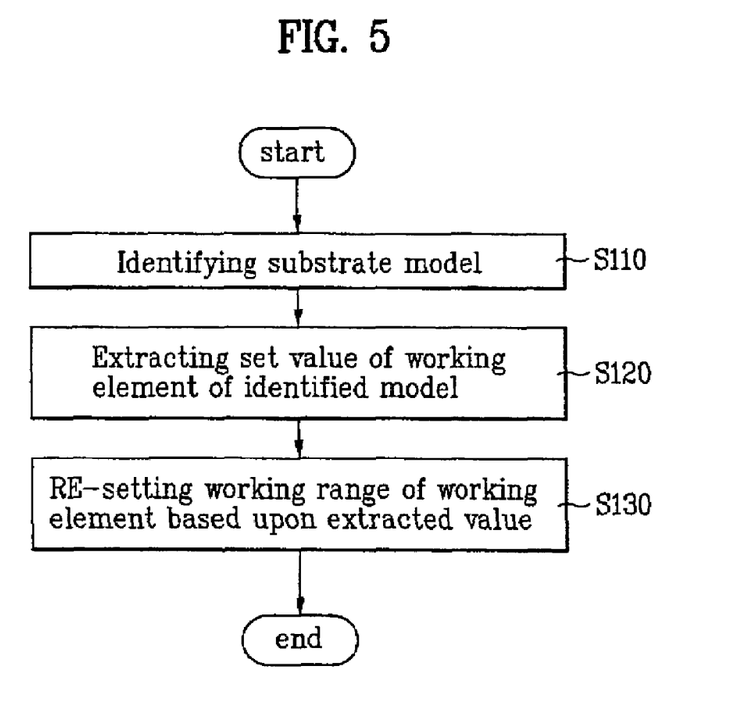
FIG. 5 is a flow chart showing an exemplary process of a bonding device for a liquid crystal display device according to the present invention.
Figure 6A:
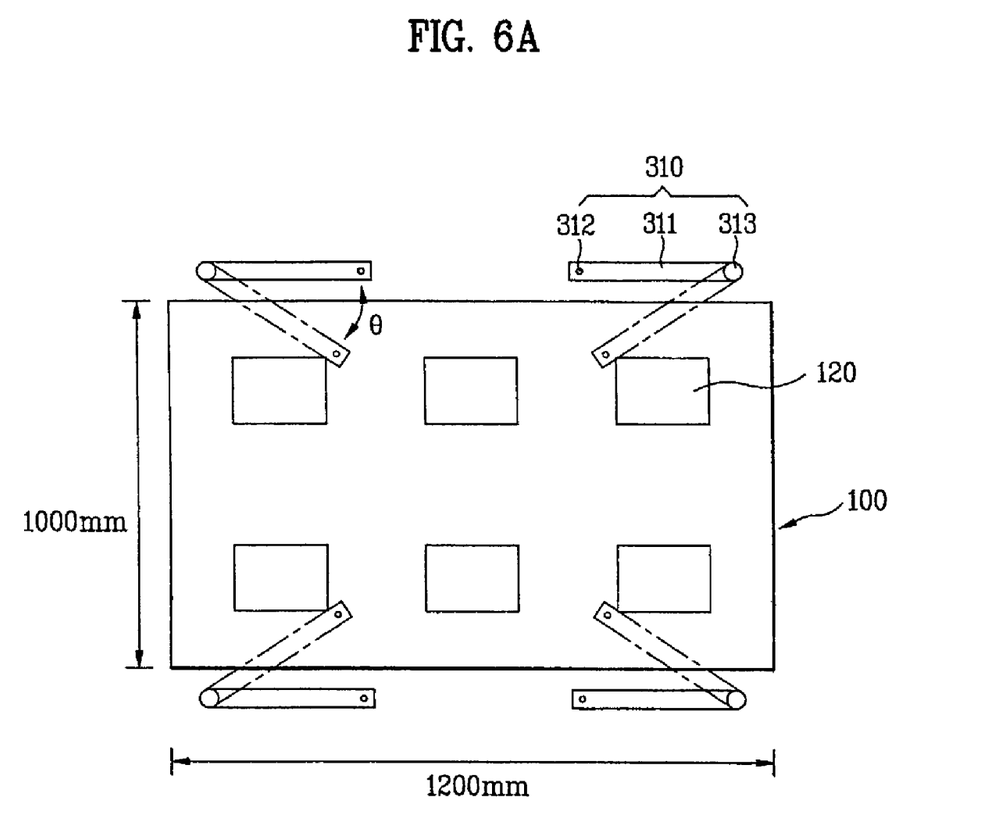
FIG. 6A is a plane view of an exemplary substrate support system for a bonding device according to the present invention.
Figure 6B:
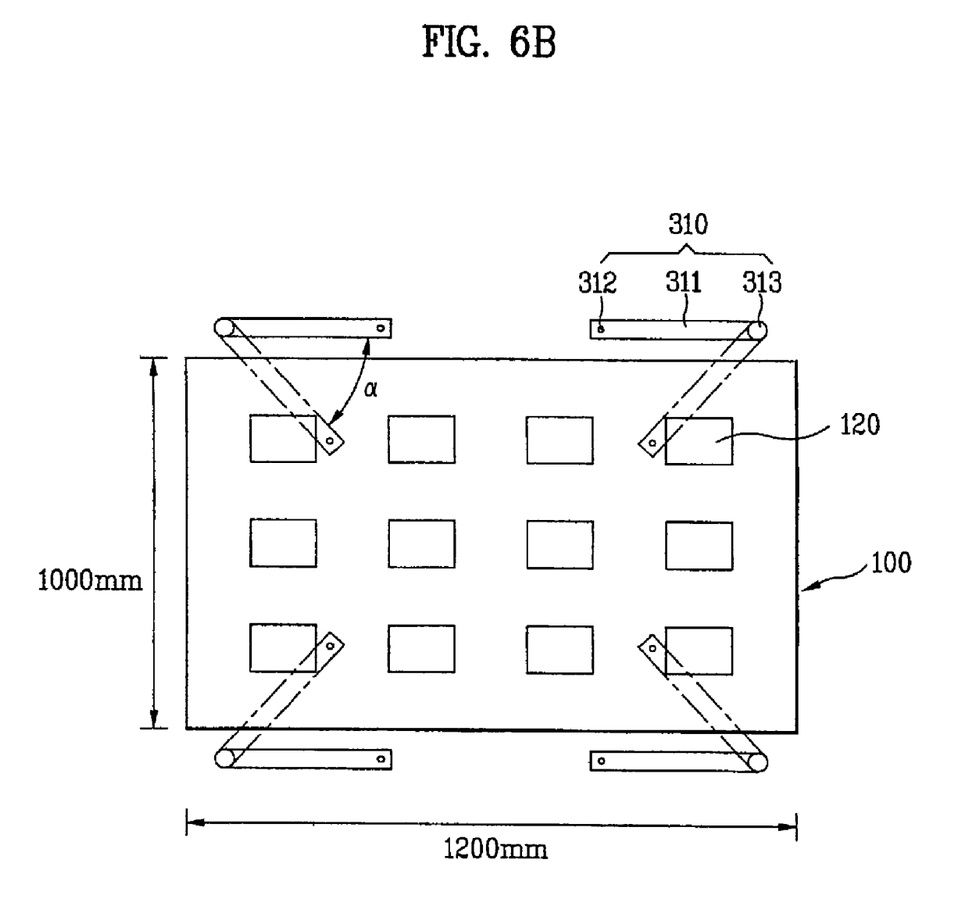
FIG. 6B is a plane view of another exemplary substrate support system for a bonding device according to the present invention.

FIG. 5 is a flow chart showing an exemplary process of a bonding device for a liquid crystal display device according to the present invention, FIG. 6A is a plane view of an exemplary substrate support system for a bonding device according to the present invention, and FIG. 6B is a plane view of another exemplary substrate support system for a bonding device according to the present invention. In FIG. 5, step S110 may include identifying a substrate configuration (i.e., model) using the substrate reading unit 230 (in FIG. 4) to read a code 110 (in FIG. 4) positioned on the substrate 100 (in FIG. 4). The code 110 (in FIG. 4) is stored in the controller 210 (in FIG. 4).

At step S120, if the code of the identified substrate 100 is identical to a code of the substrates that were used in a previous bonding process, the working elements are operated under the control of the controller to bond the corresponding substrates 100 without any change in the working range of the substrate support means 310 (in FIGS. 6A and 6B). However, if the code of the identified substrates 100 is different than a code of the substrates that were used in a previous bonding process, the controller 210 searches the storage unit 220 to extract a value set according to the working range of the substrate support means 310 with respect to the corresponding model.

At step S130, the controller 210 then re-sets the working range of the substrate support means 140 with the extracted value set.

For example, in a case where substrates each have twelve cells 120 (i.e. a model different from the previous one), are transferred as shown in FIG. 6B in a state that the substrate support means 310 is pre-set at a rotation angle to support substrates 100 each having six cells 120 and a size of 1000×1200 mm as shown in FIG. 6A, a rotation angle of the corresponding substrate support means 310 is adjusted under the control of the controller 210.

After resetting of the rotation angle of the substrate support means 310 with respect to the corresponding substrate model is completed, the controller 210 performs a control adjustment of the set values, so that the substrate support means 310 rotates at a rotation angle α different than a previous angle θ to support the corresponding substrate 100.

Figure 7:
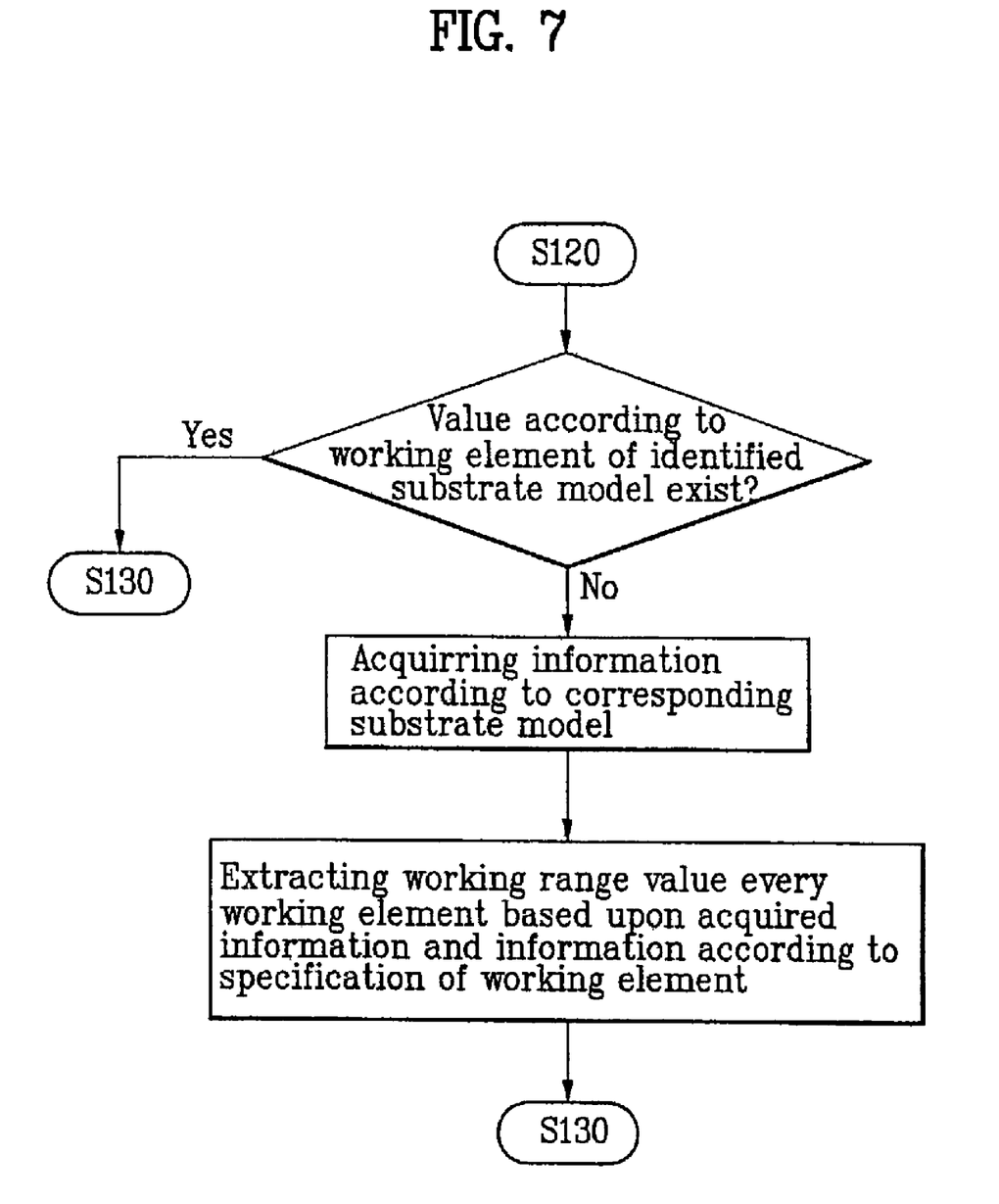
FIG. 7 is a flow chart showing an exemplary process of a bonding device for a liquid crystal display device according to the present invention.

FIG. 7 is a flow chart showing an exemplary process of a bonding device for a liquid crystal display device according to the present invention. In FIG. 7, when the set value for the working range of the working element is not registered in the storage unit 220 corresponding to the model of the substrate 100 carried in for the bonding process, a new set of corresponding working ranges of the substrate support means 310 based upon various information according to the model of the corresponding substrate 100 is produced. Then, this new working range is stored in the storage unit 220, and is re-set as the working range of the substrate support means.

Although the working range of the substrate support means 310, for a new model of substrate, can be manually entered by an operator, it is also proposed that the rotation angle of the substrate support means 310 can be automatically set based upon the number and position of the cells 120 formed in the corresponding substrate 100 and values entered with respect to the position of dummy area formed in the corresponding substrate 100. In particular, this may be done by extracting the rotation angle or the working range of the substrate support means 310 by using a virtual working simulation program.

The virtual working simulation program is established to simulate and display the working position based upon the specification (i.e., length, height, and thickness) of each working element that was previously registered. Various information is entered according to the model of the each substrate 100, and may be provided in the form of a Computer Aided Design (CAD) program. Accordingly, when the entire size of the corresponding substrate 100 and the number and position of the cells 120 are entered into the working simulation program, the program uses information, such as the length of support parts 311 of the substrate support means 310, the position of support projections 312 formed in the support parts 311, and the position of rotation shafts 313 for rotating the support parts 311 to simulate the position of the support projections 312 that is varied as the support parts 311 are varied in angle. In this manner, the program can extract the position where the support projections 312 can stably support the corresponding substrate 100 without droop. In addition, a plurality of the support projections 312 may be provided to enable correspondence with respect to the model of each substrate or varied in position according to the model of each substrate.

The value extracted may be entered into the storage unit 220 as the working range of the substrate support means 310, which is sorted according to the model of the corresponding substrate 100, so that control can be executed based upon the set value in the above entered working range when the corresponding model of substrate is transferred later. Moreover, each working element presented in the invention is not necessarily restricted to the substrate support means 310, but may include various other elements such as the upper and lower stages for loading a pair of substrates to execute a bonding process between the substrates, auxiliary loading means for loading a substrate onto the lower stage when the substrate is transferred to be loaded onto the lower stage, alignment means for aligning the position between substrates loaded onto the stages, clamping means for loading or fixing the substrates which are respectively fixed to the stages, and auxiliary process means for assisting various procedures for bonding between the substrates.

It will be apparent to those skilled in the art that various modifications and variations can be made in the working range setting method for a bonding device for fabricating liquid crystal display devices of the present invention. Thus, it is intended that the present invention covers the modifications and variations of this invention provided they come within the scope of the appended claims and their equivalents.

What is claimed is:

1. A working range setting method of a bonding device for a liquid crystal display device, the bonding device having a substrate support system capable of being elevated and rotated to support a dummy area of a central portion of a substrate, comprising steps of:

identifying a model of a first substrate for the liquid crystal display device;

extracting a set value corresponding to a working range of the substrate support system according to the identified model; and setting the working range of the substrate support system with the extracted set value such that said substrate support system contacts dummy areas of the substrate.

2. The method according to claim 1, wherein the step of identifying includes a step of reading a code formed on the first substrate.

3. The method according to claim 1, wherein the step of identifying includes reading a signal selected according to the first substrate.

4. The method according to claim 1, wherein the step of extracting includes a step of identifying the set value corresponding to the working range of the substrate support system according to the model of the first substrate stored in a storage unit based upon the identified model of the first substrate.

5. The method according to claim 1, further comprising a step of re-setting a new value corresponding to the working range of the substrate support system according to the model of a second substrate.

6. The method according to claim 5, wherein the step of re-setting includes receiving the new value from an operator.

7. The method according to claim 5, wherein the step of re-setting includes extracting the new value by using a stored program for simulating the desired working range of the substrate support system when the substrate support system operates.

8. The method according to claim 1, wherein the working range includes information regarding positioning of the substrate support system.

9. The method according to claim 8, wherein the positioning of the substrate support system includes angular positioning of substrate support arms.

10. The method according to claim 9, wherein the substrate support arms support the first substrate at dummy regions.

11. A working range setting method of a bonding device for a liquid crystal display device, the bonding device having a substrate support system capable of being elevated and rotated to support a dummy area of a central portion of a substrate, comprising steps of:

identifying a model of a first substrate for the liquid crystal display device;

extracting a set value corresponding to a working range of the substrate support system according to the identified model;

setting the working range of the substrate support system with the extracted set value; and rotating supports of the substrate support system such that said supports contact dummy areas of the substrate.

* * * * *